(12) United States Patent
Ljung et al.

(10) Patent No.: US 7,894,338 B2
(45) Date of Patent: Feb. 22, 2011

(54) METHOD AND SYSTEM FOR SERVICE ACCESS CONTROL IN SHARED NETWORKS

(75) Inventors: Rickard Ljung, Helsingborg (SE); Anders Dahlen, Västerhaninge (SE)

(73) Assignee: Teliasonera AB, Stockholm (SE)

( * ) Notice: Subject to any disclaimer, the term of this patent is extended or adjusted under 35 U.S.C. 154(b) by 747 days.

(21) Appl. No.: 11/722,958

(22) PCT Filed: Dec. 21, 2005

(86) PCT No.: PCT/SE2005/001995
§ 371 (c)(1), (2), (4) Date: Oct. 18, 2007

(87) PCT Pub. No.: WO2006/071179
PCT Pub. Date: Jul. 6, 2006

(65) Prior Publication Data
US 2008/0112353 A1 May 15, 2008

(30) Foreign Application Priority Data
Dec. 30, 2004 (SE) .................................... 0403221

(51) Int. Cl.
*G01R 31/08* (2006.01)
*H04W 4/00* (2009.01)
*H04L 12/66* (2006.01)
(52) U.S. Cl. .................. 370/230; 370/329; 370/352
(58) Field of Classification Search .............. None
See application file for complete search history.

(56) References Cited
U.S. PATENT DOCUMENTS
2004/0017798 A1   1/2004   Hurtta et al.
(Continued)

FOREIGN PATENT DOCUMENTS
EP   1 280 365   1/2003
(Continued)

*Primary Examiner*—Nittaya Juntima
(74) *Attorney, Agent, or Firm*—Oblon, Spivak, McClelland, Maier & Neustadt, L.L.P.

(57) ABSTRACT

In a method of sharing a Radio Access Network, RAN, in one or more areas by at least two operators the determination whether to grant admission or not of a User Equipment, UE, to the RAN is performed in an admission control algorithm. A Radio Network Controller, RNC, is reading Network Resource Identifier, NRI, information contained in an "Initial Direct Transfer" message sent by the UE when requesting a service, and the read NRI information is used in a service admission control to check a plurality of service admission parameters as a part of a set of admission control parameters to grant or reject the requested service depending on whether the operator associated with the NRI has invested in needed technology or not. A corresponding radio access network comprises admission control means to determine whether to grant admission of a User Equipment, UE, to the network, RAN, or not. A Radio Network Controller, RNC, is arranged to read NRI, information contained in the "Initial Direct Transfer" message sent by an UE, when requesting a service, and sending the read NRI information to the admission control means to check a plurality of service admission parameters as a part of a set of admission control parameters to grant or reject the requested service depending on whether the operator associated with the NRI has invested in needed technology or not.

15 Claims, 7 Drawing Sheets

| U.S. PATENT DOCUMENTS | | | | |
|---|---|---|---|---|
| 2006/0183502 A1* | 8/2006 | Jeong et al. | ............... | 455/560 |
| 2006/0193289 A1* | 8/2006 | Ronneke et al. | ............ | 370/329 |
| 2007/0047486 A1* | 3/2007 | Lee et al. | ................ | 370/329 |
| 2007/0047493 A1* | 3/2007 | Park et al. | ................ | 370/331 |

| FOREIGN PATENT DOCUMENTS | | |
|---|---|---|
| WO | 2004075576 | 9/2004 |
| WO | 2004084572 | 9/2004 |

* cited by examiner

METHOD AND SYSTEM FOR SERVICE ACCESS CONTROL IN SHARED NETWORKS

TECHNICAL FIELD

The present invention relates to a method of sharing a Radio Access-Network, RAN, in one or more areas by at least two operators, wherein the determination whether to grant admission or not of an User Equipment, UE, to the RAN is performed in an admission control algorithm. The invention also relate to a radio access network intended to be shared in one or more areas by at least two operators, comprising admission control means to determine whether to grant admission of a service request from an User Equipment, UE, to the network, RAN, or not.

BACKGROUND

In a shared network two or more operators share a Radio Access Network, RAN, in one or more areas. However, the different operators may wish to differentiate their services from the RAN to their respective customers. If not all operators in the shared network want to invest in new Universal Mobile Telecommunication System, UMTS, Terrestrial Radio Access Network, UTRAN, technology as for example High Speed Downlink Packet Access, HSDPA, High Speed Uplink Packet Access, HSUPA, (even called Enhanced Dedicated Channel, E-DCH), Multimedia Broadcast Multicast Service, MEMS, or Voice over IP, VoIP, bearers, it should be possible to block customers of the operators not investing in the new technology. Moreover, in a rural area one operator might want interactive service with bit rates up to 384 kbps, whereas other operators might be content with 128 kbps.

EP 1 443 790 describes a method and a system for sharing the capacity in a radio access multi operator mobile network. It is based on the pre-release 6 roaming based network sharing solution. For the sharing decision the operator, that serves the subscriber demanding the resource, is identified. The available resources for the serving operator are checked, and the use of the available resources in the network, based on a set of sharing rules, is controlled. The means of sharing rules are to prioritize home subscribers over roaming subscribers (e.g. customers of virtual network operators or operators using national roaming), or to control the resource allocation (power) to guarantee each operator an agreed capacity share.

In WO 2004/030393 a resource management for a cellular communication system is described. A resource controller is operable to allocate a radio resource to a subscriber unit in response to an operator identity associated with a service of the subscribers unit, such that different quality of service is achieved for different operators. The cellular communication system has a common radio access network resource divided into a first partition for a first operator and a second partition for a second operator, and the resource controller is operable to allocate resources from the first partition if the operator identity corresponds to the first operator and from the second partition if the operator identity corresponds to the second operator.

In US 2004/00157600 a technique is described for determining whether to grant access for a user equipment to a radio access network in a present position of the user equipment within a communications system. The communications system comprises a control node handling services for the user equipment and an access node controlling the access network.

US 2002/01223348 discloses a technique for precluding or rejecting accesses, in competition areas, to cells of a first operator's network attempted by or on behalf of a mobile terminal which subscribes to a second operators network. Any cell of the first operator network for which the second operator network has a competing cell is designated as a restricted cell, and attempted utilization of the restricted cell by the user equipment unit which subscribes to the second operator network is rejected.

Today's technology thus allows for admission control of different services to ensure a certain level of Quality of Service, QoS. An enhanced Network Sharing, NS, support is presently being standardized in 3rd Generation Partnership Project in 3GPP, for Release 6. Each operator will be able to have its PLMN identity broadcast in the shared network and each operator has a core network. The core network nodes MSC and SGSN can be shared as well. Virtual network operators are not included in our usage the term "operator" here. The 3GPP standard allows differentiation of the services to different customers, but this is managed and controlled by the Core Network, CN. The aim of this service differentiation is to set different QoS on the same service to different customers. Letting CN manage the above proposed service admission control is not a good way forward for two reasons, first, CN is not involved in some of the signaling procedures in question, second it does not prevent abuse from an operator.

When this NS approach is available there will exist UE:s that support this enhanced network sharing feature (from Rel-6) and old UE:s that do not support this enhanced network sharing feature. The network will however be able to handle both UE types. The routing of the traffic to the CN:s of the different operators in the shared network might be performed by somewhat different methods for old and new UE:s.

When old UE:s request a service the Radio Network Controller, RNC, will read the Network Resource Identifier, NRI, in the "Initial Direct Transfer" message. The idea is that the most significant bits in the NRI could specify a customer's operator. The RNC uses this information to route the traffic to the correct Core Network, C-N, i.e. the CN belonging to the operator for the specific user.

The new UE:s that support the enhanced network sharing feature will also send an NRI. However, the 3GPP standardization does not require that the NRI:s will be used for routing the traffic to the correct CN. The new UE will, however, send information of selected Public Land Mobile Network, PLMN, (selected CN), which could then be used for routing.

The purpose of the present invention is to propose a technique for differentiating allowed service access between operators in a shared network of the above indicated kind.

DISCLOSURE OF THE INVENTION

This purpose is obtained by a method and a network of the kind mentioned in the introductory portion and having the characterizing features of claims 1 and 11 respectively.

In the present invention the operator information, i.e. the NRI information for old UEs and selected CN (selected PLMN) or NRI for new UEs, is also used in the admission control algorithm. If the operator information is associated with operator A then the admission control can reject a request of using HSDPA or MBMS etc, whereas operator B's customers are granted such requests if the available resources admit it. Hence, there will be a "service admission control" in addition to, or as a part of, the admission control for QoS in the Controlling RNC, CRNC, and some service admission parameters are a part of the set of admission control parameters. With the present invention differentiation is admitted of allowed UTRAN service access between operators in a shared network. The functionality is implemented as a part of the QoS admission control function in CRNC of the UMTS networks, alternatively as a service admission control in SRNC that is separate from the QoS admission control.

According to advantageous embodiments of the invention the above mentioned parameters will be of the type: HSDPA, operator A=True/False, HSDPA, operator B=True/False, MBMS, operator A=True/False . . . etc.

According to other advantageous embodiments of the invention the service admission parameters comprise Operation and Management, O&M, parameters set by the UTRAN supporting company, or set by network manufacturer, viz hard coded from operator perspective. If each of the operators which shares network manages a part of the UTRAN, the hard coded solution could be preferred to avoid abuse from an operator. The network manufacturer will then update the parameter settings as new UTRAN technology is ordered.

According to still other advantageous embodiments of the invention the RNC maps the operator information, in the NRI or in the selected PLMN information contained in the "Initial direct transfer" message, to an integer, where integer number "1" could mean operator A, "2" operator B, etc. In this, way, the service admission control will not need two procedures and two sets of parameters to manage "old" and "new" UE:s.

According to yet other advantageous embodiments of the invention if the service admission control is performed by the Serving Radio Network Controller, SRNC, and an UE request is sent to a Drift Radio Network Controller, DRNC, by SRNC only if the service admission control admits the request. Moreover, when DRNC wishes to set up or modify a radio bearer it informs the SRNC which then performs the service admission control and grants the requested set up or modification from DRNC if admitted by the service admission control. In this way a solution to the problem that 3GPP standard does not support sending the explicit operator information to the DRNS is to place the service admission control function in the SRNC instead. This is a feasible solution since it is the SRNC that requests radio bearer set ups and modifications at the DRNC. Hence, the SRNC performs the service admission control and sends the requests to the DRNC only when the service admission admits the request. Alternatively the DRNC informs the SRNC that it wishes to modify or set up a radio bearer, and the SRNC then performs the service admission control. The SRNC grants the request from the DRNC if the service admission admits it. Placing the service admission control in the CRNC should be possible, since for example EP 1 443 790 claims, and is based on, that it is possible to pass on information of operator belongings to the CRNC in a prerelease 6 UMTS network even though EP 1 443 790 does not describe how.

BRIEF DESCRIPTION OF THE DRAWINGS

The invention will now be described in greater details with reference to the enclosed drawings on which

DETAILED DESCRIPTION OF PREFERRED EMBODIMENT

Figure 1:
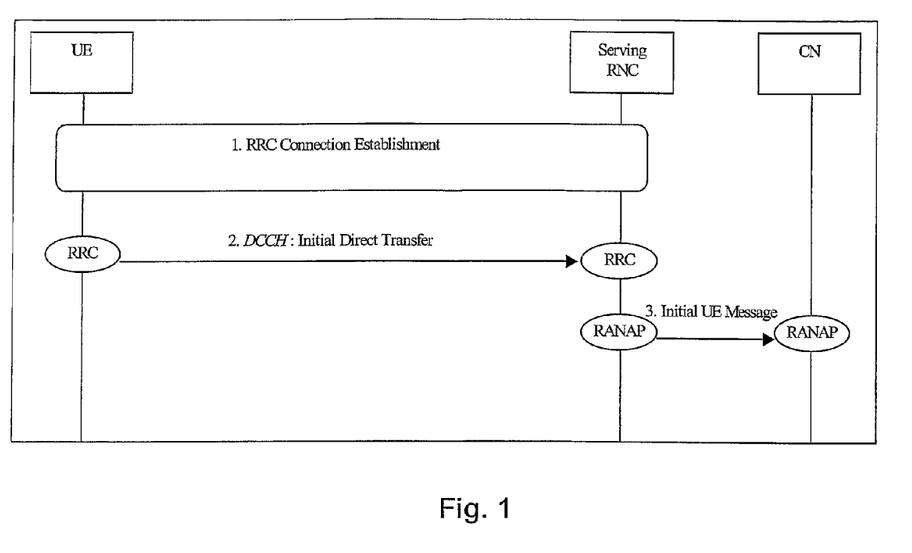
FIG. 1 illustrates the functionality with the initial direct transfer message carrying the NRI.

As mentioned above an enhanced network sharing support is standardized in 3GGPP for Release 6. With this NS approach there will exist UE:s that support this enhanced network sharing feature (from Rel-6) and old UE:s that do not. The network will however, be able to handle both UE types. Thus when old UE:s request a service the RNC will read the NRI in the "Initial Direct Transfer" message as illustrated in FIG. 1. The RNC then uses this information to route the traffic to the correct CN. In Rel-6 UE this message also carries selected PLMN, as selected CN, at least at registration. In this later case, NRI:s for these UE:s might not be organized so that the most significant NRI bits specify the operator. On the other hand, nothing in the standard will prevent the new UE:s from supporting the NRI solution as well. Anyhow, if the NRI solution is not supported, the selected PLMN information that the RNC receives from the UE in the initial direct transfer message, as illustrated in FIG. 1, could be used in the service admission control feature.

When there is a new request of resources for a new radio bearer then the admission control process gets the operator information i.e. the integer number, as mentioned above. The service admission control and the now existing Quality of Service, QoS, perform an admission check of the request. The request is granted if the request is admitted by both procedures. The service admission control procedure either relies on that the operator information is received as an input into the procedure at each request of a "radio bearer change", e.g. Radio Bearer Reconfiguration, Transport Channel Reconfiguration, or Physical Channel Reconfiguration or that the operator information for the radio bearer is stored in the procedure together with the bearer's identity number. When there is a request of a radio bearer change the service admission control checks whether it is an allowed change or not from a service perspective.

The Controlling RNC, CRNC, of a Node B is the RNC which performs admission and congestion control on the cells of the Node B. If more than one RNC is involved in the connection path between an UE and the CN, a RNC is either a SRNC or a DRNC. A UTRAN connected UE has one and only one SRNC, but it may have zero, one or more DRNC:s.

Figure 2:
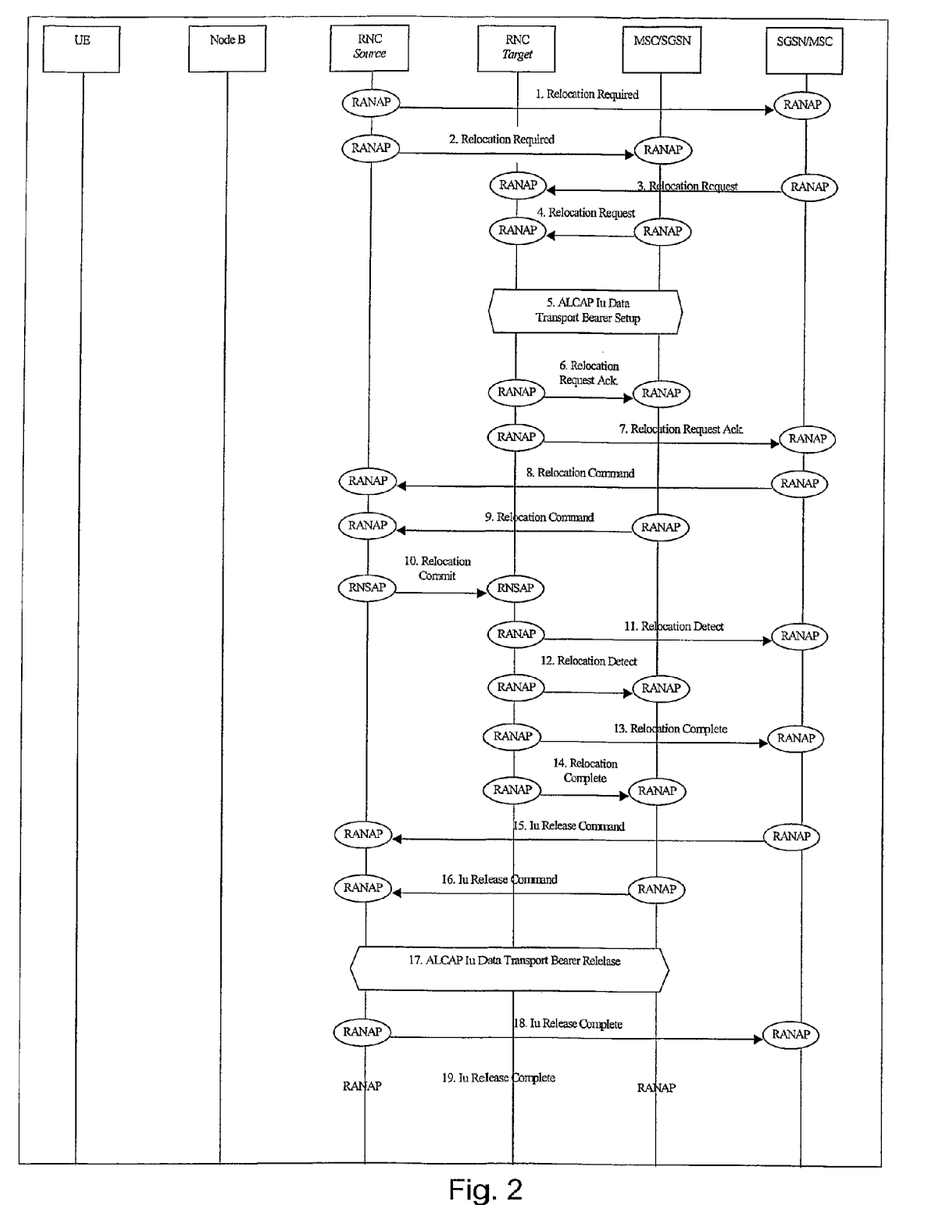
FIG. 2 is a message sequence chart illustrating an example of SRNC relocation.

A SRNC is responsible for routing traffic to the correct CN node (the routing mechanism is under the Radio Resource Control's RRC's responsibility). Hence, the SRNC has the NRI or selected PLMN information. The NRI routing works as in Iu-flex, e.g. SRNC relocation. The CN is involved in the SRNC relocation, and it is the CN that sets up the connection between the new SRNC and the SGSN node. This procedure is illustrated in FIG. 2 which illustrates SRNS Relocation in a situation with an UE connected to two CN nodes. The operator information can be passed along to the new SRNC at SRNC relocations. For example, the relocation request message sent from CN to target SRNC can contain the operator information (PLMN identity) in a release 6 network. Alternatively, the new SRNC knows which CN it is connected to and can determine the operator belonging of the UE backwards, i.e. from the CN connection information the RNC can conclude the most significant bits of the NRI. Normally, the RNC looks at the NRI and concludes which CN to connect/route to. This works in the Multi Operator Core Network, MOCN, case, i.e., under the assumption that the operators only share the UTRAN. In the GWCN case it should be possible to coordinate S-RNTI numbers between the operators so that for example the most significant bits indicate operators belonging. The S-RNTI is sent from the SRNC to the target RNC at SRNC relocation.

A DRNC may perform macro diversity combining and splitting. It routes the data transparently between the Iub and Iur interface to the SRNC, except when common or shared channels are used in the UE connection.

Figure 3:
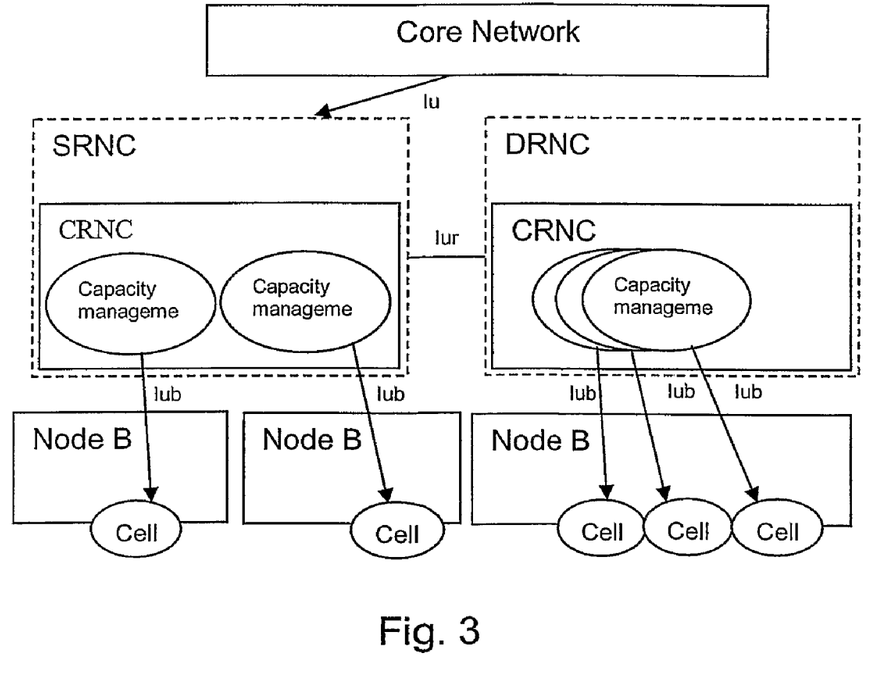
FIG. 3 illustrates an example of admission control.

Hence, the SRNC performs admission control or capacity management on the cells which is controlled by the SRNC, and the DRNC performs admission control on the cells under its control, as illustrated in FIG. 3.

The DRNC does not get or possess neither the NRI nor the selected CN (PLMN) of a UE. The 3GPP standard does not support sending neither the NRI nor the selected CN (PLMN) form SRNC to DRNC (CRNC). Hence, the DRNC cannot perform service admission control based on operator information of this kind, however this information could be added in an existing message from the SRNC to the DRNC (CRNC). One solution to the lack of explicit operator information in a DRNC can be to always perform SRNS relocation when a user moves to an area controlled by a different RNC, or that one use the non-described procedure that EP 1 443 790 relies on.

A solution to the problem that the 3GPP standard does not support sending the explicit operator information to the DRNC is to place the service admission control function in the SRNC instead. This is a feasible solution since the SRNC requests radio bearer setups and modifications at the DRNC. Hence, the SRNC performs the service admission control and sends the request to the DRNC only if the service admission admits the request, as discussed above. Alternatively, the DRNC informs the SRNC of a wish to modify or set up a radio bearer, and the SRNC can then perform the service admission control. The SRNC grants the request from the DRNC if the service admission admits it. After SRNC relocation the new SRNC gets the operator information as described earlier.

If one wants to perform different service admissions in different location areas or even on different cells, performing the service admission control in the SRNC will be somewhat complex. Basically, each RNC with SRNC functionality will need to have a set of service admission parameters for each location area or cell in the entire network. This is the reason why placing the service admission control in the admission control according to the present invention involves an important advantage.

Some examples of signaling procedures in 25.931 are displayed to verify that the SRNC is involved in the radio bearer establishment and modification procedure even for DRNC:s. MBMS and HSUPA are not yet standardized, but there is no reason for deviation from the present signaling procedures for these technologies.

Figure 4:
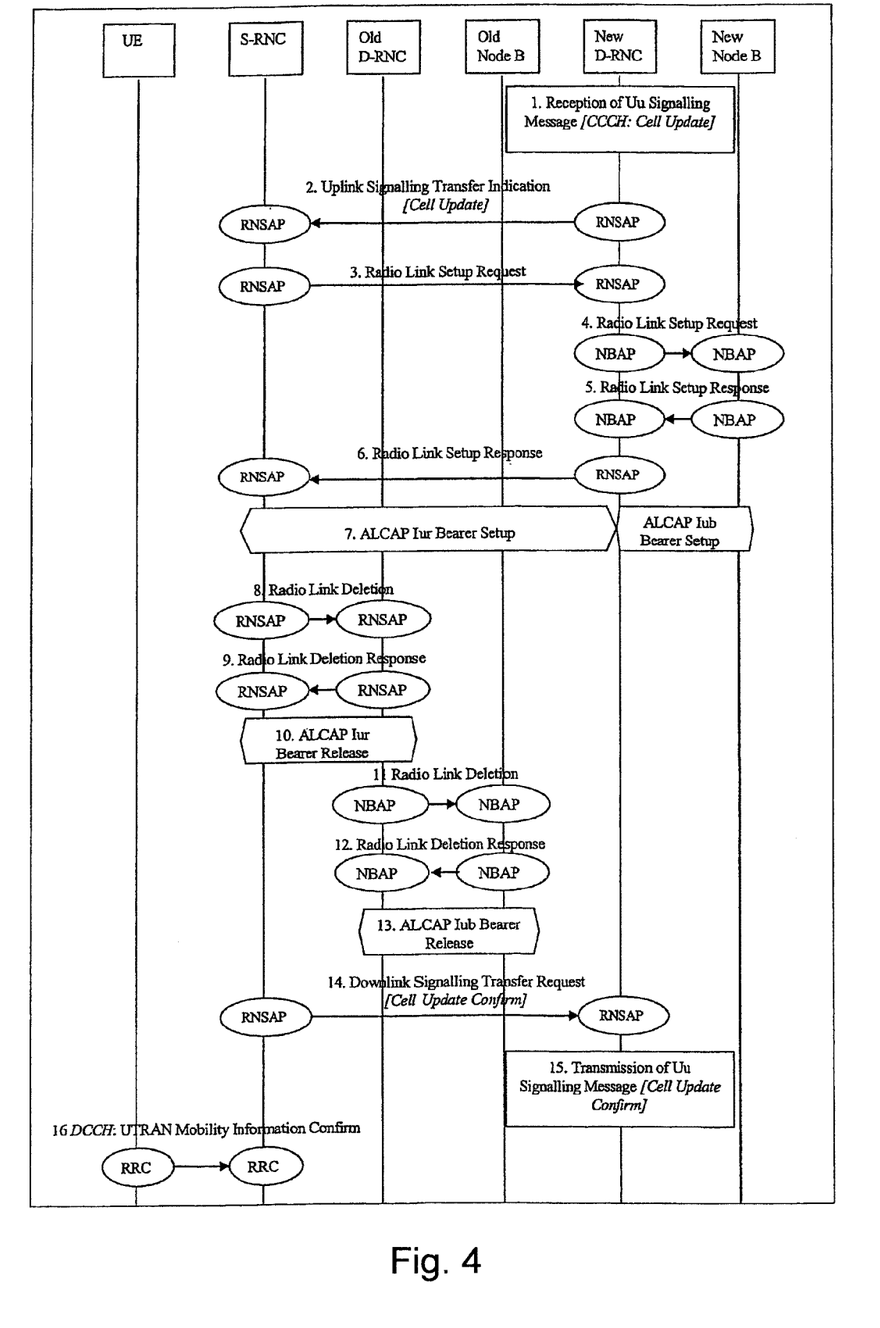
FIG. 4 illustrates an example of Radio Resource Control, RRC re-establishment—Dedicated Channel, DCH, re-establishment.

FIG. 4 is a message sequence chart illustrating a first example of re-establishment of a RRC connection, anchor approach, in dedicated transport channel, DCH, state.

Figure 5:
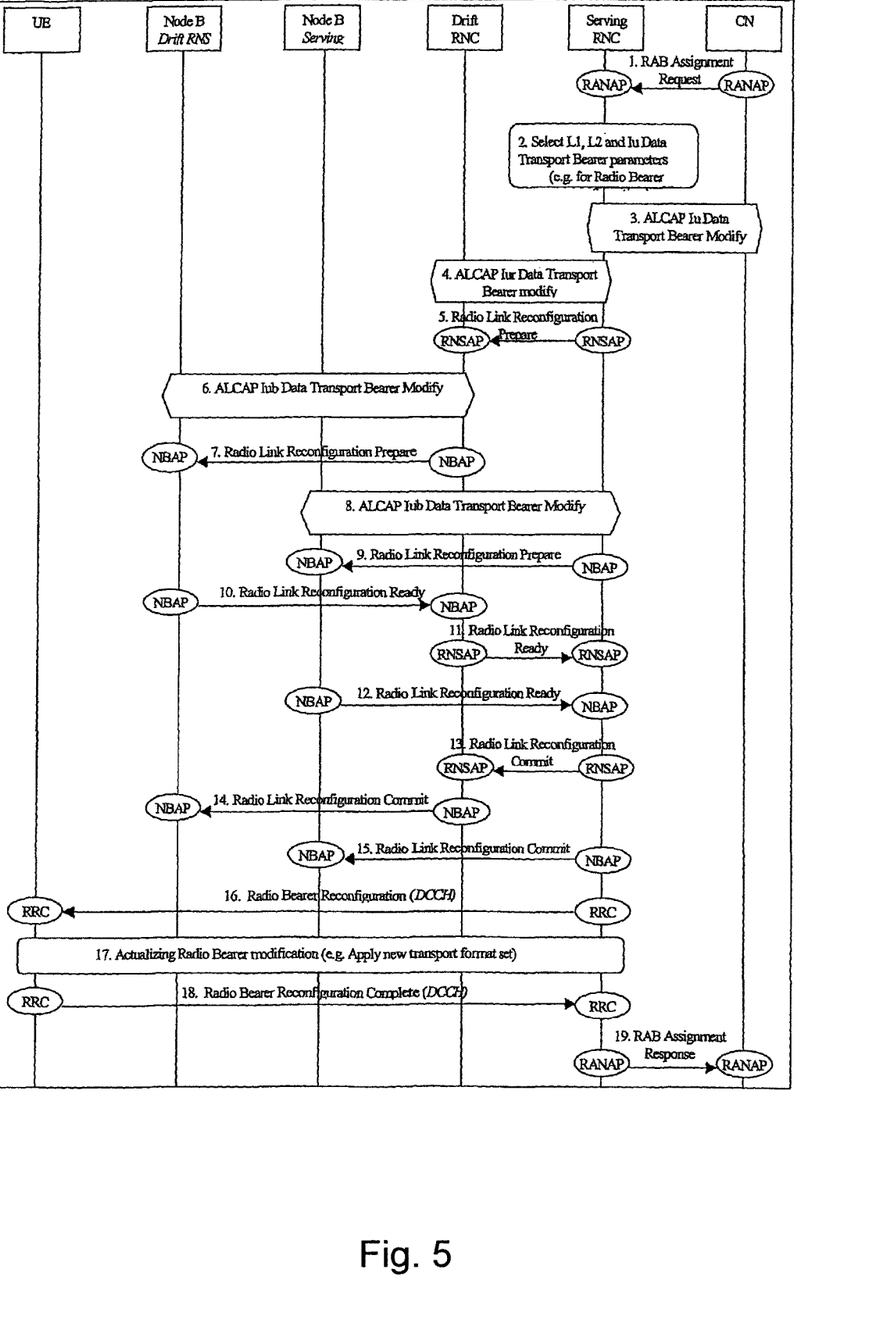
FIG. 5 illustrates an example of radio access bearer modification.

FIG. 5 illustrates an example showing modification of a radio access bearer established on a DCH with UE in macro diversity between two RNC:s. A Network Subsystem Application Part, NSAP, synchronized procedure is used and a successful case is shown. For an unsuccessful case it is important to note that a failure message can be sent in any point of the illustrated message sequence chart.

Figure 6:
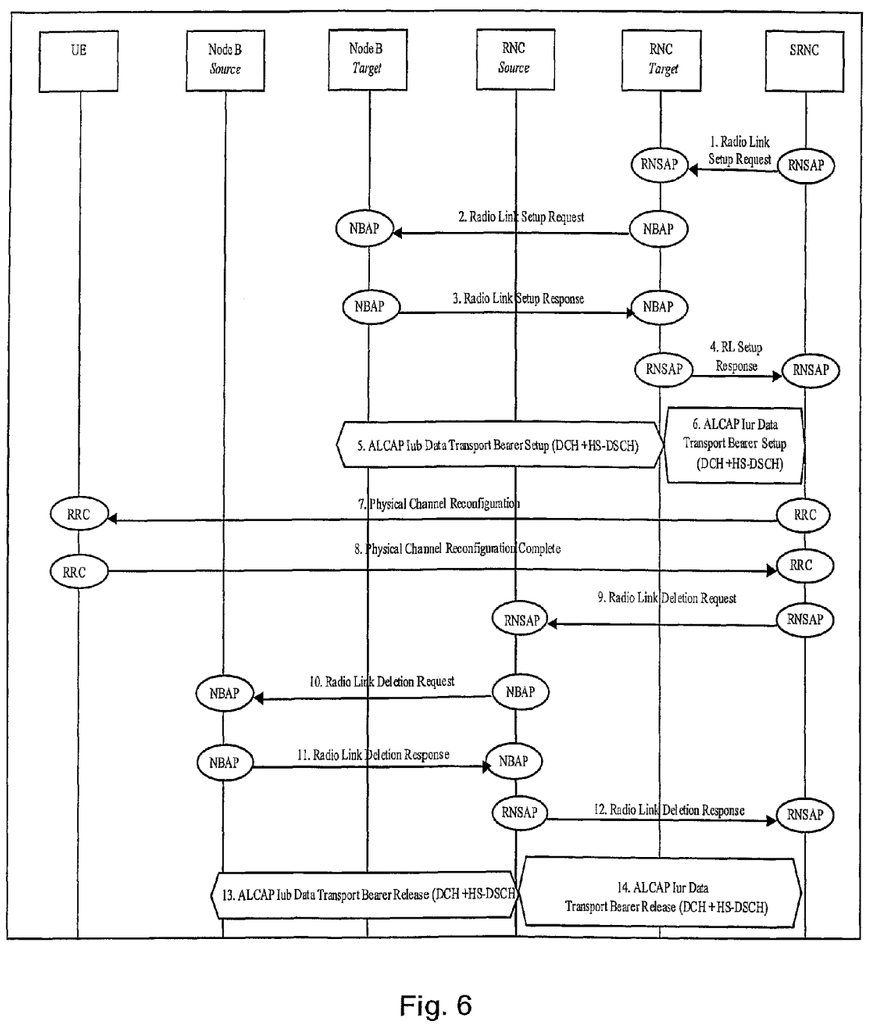
FIG. 6 illustrates inter-node B synchronized serving High Speed Downlink Shared Channel, HS-DSCH, cell change at hard handover.

FIG. 6 is a message sequence chart illustrating a third example with Inter-Note B synchronized serving HS-DSCH cell change at hand over. The source Node B and the target Node B are controlled by two different DRNC:s, referred to as source DRNC and target DRNC, respectively. In this case the High Speed-Downlink Shared Channel, HS-DSCH, the shared channel of HSDPA, mobility procedure is performed in a single step.

Figure 7:
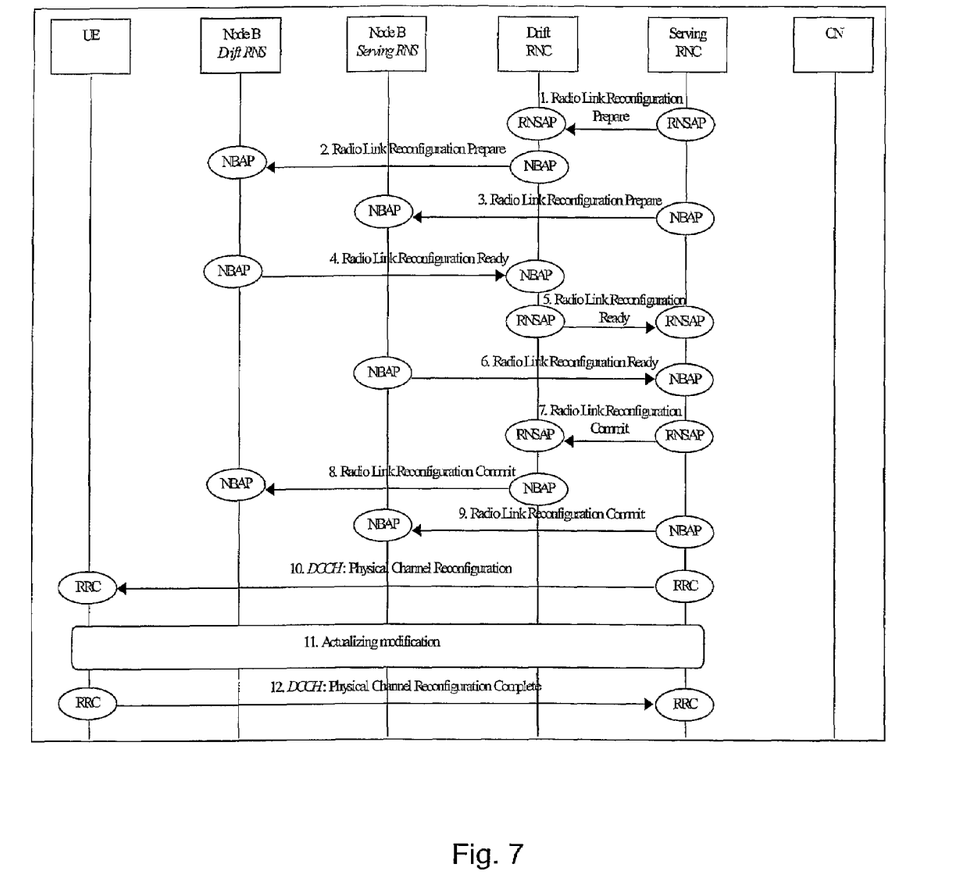
FIG. 7 shows an example of physical channel reconfiguration.

FIG. 7 shows the message sequence chart for an example for the physical channel reconfiguration in dedicated channel DCH, Radio Resource Control, RRC, state. This procedure can be used, for example, to change the Up-Link, UL, scrambling code of an UE.

| Abbreviations | |
|---|---|
| 3GPP | 3$^{rd}$ Generation Partnership Project |
| CN | Core Network |
| CRNC | Controlling RNC |
| DCH | Dedicated Channel |
| DL | Downlink |
| DRNC | Drift RNC |
| DSCH | Downlink Shared Channel |
| HSDPA | High Speed Downlink Packet Access |
| HSUPA | High Speed Uplink Packet Access |
| HS-DSCH | High Speed Downlink Shared Channel |
| GWCN | Gateway Core Network |
| MBMS | Multimedia Broadcast Multicast Service |
| MOCN | Multi Operator Core Network |
| NBAP | Node B application Part |
| NRI | Network Resource Identifier |
| NS | Network Sharing |
| O&M | Operation & Management |
| PLMN | Public Land Mobile Network |
| QoS | Quality of Service |
| RAB | Radio Access Bearer |
| RAN | Radio Access Network |
| RANAP | Radio Access Network Application Part |
| RB | Radio Bearer |
| RNC | Radio Network Controller |
| RNSAP | Radio Network Subsystem Application Part |
| RRC | Radio Resource Control |
| SRNC | Serving RNC |
| UE | User Equipment |
| UMTS | Universal Mobile Telecommunication System |
| UL | Uplink |
| UTRAN | UMTS Terrestrial Radio Access Network |
| VoIP | Voice over IP |

The invention claimed is:

1. A method of sharing a Radio Access Network, RAN, in one or more areas by at least two operators, the method comprising:

determining whether to grant admission of an User Equipment, UE, to the RAN via a service admission control, wherein a Radio Network Controller, RNC, reads Network Resource Identifier, NRI, information, said read NRI information being used in the service admission control to check a plurality of service admission parameters as a part of a set of admission control parameters to grant or reject requested service depending on whether an operator associated with the NRI has invested in needed technology, said NRI information is contained in an "Initial Direct Transfer" message sent by the UE when requesting a service, traffic is routed to correct Core Network, CN, by a Serving Radio Network Controller, SRNC, the service admission control is performed by the SRNC, an UE request is sent to a Drift Radio Network Controller, DRNC, by SRNC only when the service admission control admits the UE request, and when DRNC requests to set up or modify a radio bearer, the DRNC informs the SRNC which then performs the service admission control and grants the requested set up or modification from the DRNC when admitted by the service admission control.

2. The method according to claim 1, wherein said plurality of service admission parameters includes Operation and Management, O&M, parameters set by Universal Mobile Telecommunication System, UMTS, Terrestrial Radio Access Network, UTRAN, supporting company or set by network manufacturer.

3. The method according to claim 2, said network sharing being performed as standardized in $3^{rd}$ Generation Partnership Project, 3GPP, for Release 6, wherein said plurality of service admission parameters includes High Speed Downlink Packet Access, HSDPA, Operator A=True/False, HSDPA Operator B=True/False, High Speed Uplink Packet Access, HSUPA, Operator A=True/False, HSUPA Operator B=True/False, Multimedia Broadcast Multicast Service, MBMS, Operator A=True/False, MBMS Operator B=True/False, and/or Voice over IP, VoIP, Operator A=True/False, VoIP, Operator B=True/False.

4. The method according to claim 1, wherein the Radio Network Controller, RNC, maps information about the operator to an integer identity number for the operator.

5. The method according to claim 4, wherein, in case of a request of resources for a new radio bearer, operator information is supplied to the service admission control and a Quality of Service, QoS, admission control of the request is performed, and, when the request is admitted by both admission controls, the service admission control relies on operator information sent at each request of a radio bearer change, or on operator information for the radio bearer stored together with the bearer's identity number.

6. The method according to claim 5, wherein the allowance of a requested radio bearer change is checked in the service admission control from a service perspective.

7. The method according to claim 1, wherein admission and congestion controls on the cells of a specific node are performed by a Controlling Radio Network Controller, CRNC, of said node.

8. A radio access network, RAN, intended to be shared in one or more areas by at least two operators, comprising:
an admission control unit configured to determine whether to grant admission of an User Equipment, UE, to the RAN; and
a Radio Network Controller, RNC, configured to read Network Resource Identifier, NRI, information and send said read NRI information to said admission control unit to check a plurality of service admission parameters as a part of a set of admission control parameters to grant or reject the requested service depending on whether an operator associated with the NRI has invested in needed technology, wherein
said NRI information is contained in an "Initial Direct Transfer" message sent by an UE, when requesting a service,
a Serving Radio Network Controller, SRNC
routes traffic to correct Core Network, CN,
performs service admission control via the admission control unit, and
sends an UE request to a Drift Radio Network Controller, DRNC, only when the admission control unit admits the UE request,
the DRNC informs the SRNC about requests to set up or modify a radio bearer, and the SRNC performs the service admission control and grants requested set up or modification from DRNC when admitted by the admission control unit.

9. The network according to claim 8, wherein said plurality of service admission parameters includes Operation and Management, O&M, parameters set by Universal Mobile Telecommunication System, UMTS, Terrestrial Radio Access Network, UTRAN, supporting company or set by network manufacturer.

10. The network according to claim 9, said network sharing being performed as standardized in $3^{rd}$ Generation Partnership Project, 3GPP, for Release 6, wherein said plurality of service admission parameters includes High Speed Downlink Packet Access, HSDPA, Operator A=True/False, HSDPA Operator B=True/False, High Speed Uplink Packet Access, HSUPA, Operator A=True/False, HSUPA Operator B=True/False, Multimedia Broadcast Multicast Service, MBMS, Operator A=True/False, MBMS Operator B=True/False, and/or Voice over IP, VoIP, Operator A=True/False, VoIP Operator B=True/False.

11. The method according to claim 8, wherein the Radio Network Controller, RNC, is arranged to map information about the operator to an integer identity number for the operator.

12. The network according to claim 11, wherein, in case of a request of resources for a new radio bearer, said admission control unit receives operator information and performs service admission control and a Quality of Service, QoS, admission control of the request, and, when the request is admitted by both controls, the admission control unit is relying on operator information sent at each request of a radio bearer change, or on operator information for the radio bearer stored together with the bearer's identity number.

13. The network according to claim 12, wherein the admission control unit checks the allowance of a requested radio bearer change from a service perspective.

14. The network according to claim 8 wherein a Controlling Radio Network Controller, CRNC, of a specific node controls node admission and congestion on the cells of said node.

15. The network according to claim 8, wherein more than one RNC is involved in the connection between an UE and the Core Network, CN, wherein each RNC is either a Serving Radio Network Controller, SRNC, or a Drift Radio Network Controller, DRNC.

* * * * *